US006787255B2

United States Patent
Misumi (10) Patent No.: US 6,787,255 B2
(45) Date of Patent: Sep. 7, 2004

(54) FUEL CELL POWER GENERATING SYSTEM AND OPERATION METHOD

(75) Inventor: Yoshiteru Misumi, Tokyo (JP)

(73) Assignee: Kurita Water Industries, Ltd, Tokyo (JP)

( * ) Notice: Subject to any disclaimer, the term of this patent is extended or adjusted under 35 U.S.C. 154(b) by 365 days.

(21) Appl. No.: 09/885,672

(22) Filed: Jun. 20, 2001

(65) Prior Publication Data

US 2001/0053470 A1 Dec. 20, 2001

(30) Foreign Application Priority Data

Jun. 20, 2000 (JP) .................................... P2000-185355
Jun. 20, 2000 (JP) .................................... P2000-185356

(51) Int. Cl.$^7$ ............................................ H01M 8/04
(52) U.S. Cl. ............................ 429/13; 429/25; 429/26
(58) Field of Search ............................ 429/12, 13, 22, 429/24, 26, 19; 204/524, 533, 536

(56) References Cited

U.S. PATENT DOCUMENTS 4,120,787 A * 10/1978 Yargeau .................... 210/664
4,973,529 A * 11/1990 Grasso et al. .................. 429/12
6,146,781 A * 11/2000 Surampudi et al. ............ 429/35
6,171,718 B1 * 1/2001 Murach et al. ................ 429/13
6,376,113 B1 * 4/2002 Edlund et al. ................. 429/19
6,511,765 B2 * 1/2003 Ueno et al. .................... 429/22

* cited by examiner

Primary Examiner—Bruce F. Bell
Assistant Examiner—Monique Wills
(74) Attorney, Agent, or Firm—Scully, Scott, Murphy & Presser (57) ABSTRACT

Disclosed is a fuel cell power generating system which comprises a fuel cell unit having a coolant circulation system; a water storage tank for supply water to serve as coolant for the fuel cell unit; a water treatment system for purifying the supply water in the water storage tank and supplying the purified supply water as coolant to the fuel cell unit; heating means for heating water; a hot water storage tank for hot water acquired by the heating means; and a condensed-water supply system for supplying the water storage tank with condensed water obtained by condensing steam from the hot water in the hot water storage tank.

11 Claims, 4 Drawing Sheets

FUEL CELL POWER GENERATING SYSTEM AND OPERATION METHOD

BACKGROUND OF THE INVENTION

1. Field of the Invention

The present invention relates to a power generating system using a fuel cell which generates a fuel gas containing a hydrogen gas by reforming fuel such as a natural gas with steam, and generates power by reacting the fuel gas with an oxidizing gas, such as oxygen in the air, by electrochemical reaction, and an operation method for the system.

This application is based on Japanese Patent Application Nos. 2000-185355 and 2000-185356, the content of which are incorporated herein by reference.

2. Description of the Related Art

A fuel cell power generating system typically uses coolant, which adjusts the temperature inside a fuel cell stack, in order to keep the power generating efficiency of the fuel cell high. The coolant is normally subjected to demineralization before usage.

Figure 6:
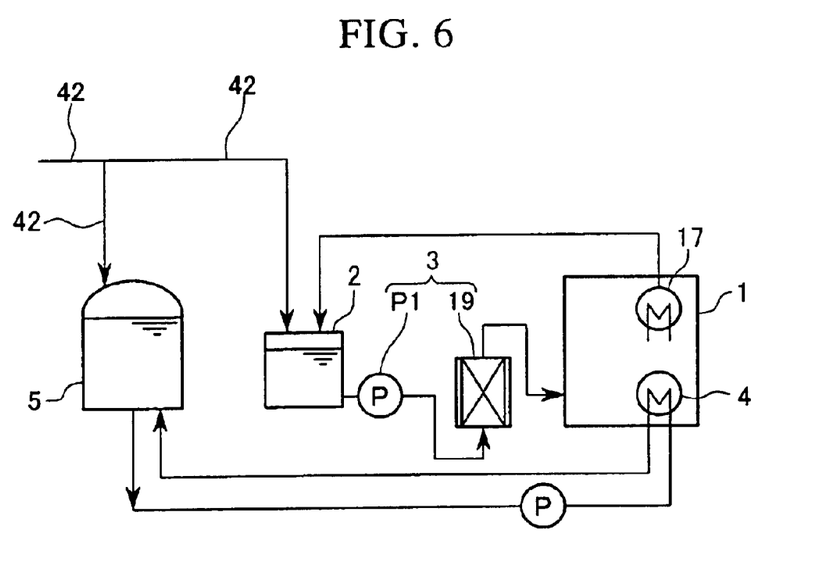
FIG. 6 is a structural diagram exemplifying a conventional fuel cell power generating system.

FIG. 6 exemplifies a fuel cell power generating system, which comprises a fuel cell unit 1, a water storage tank 2 for water which serves as the coolant for the fuel cell unit 1, a water treatment system 3 which performs purification of the water in the water storage tank 2 and supplies the resultant water as coolant to the fuel cell unit 1, a heat exchanger 4 for recovering the exhaust heat which heats water using the exhaust heat from the fuel cell unit 1, a hot water storage tank 5 which retains hot water obtained by using the heat exchanger 4, and a auxiliary water supply path 42 which supplies auxiliary water to the water storage tank 2.

The fuel cell unit 1 has a heat exchanger 17 for recovering the condensed water in the exhaust gas which recovers steam in the exhaust gas as condensed water.

The water treatment system 3 has water purifying equipment 19 such as an ion-exchange demineralizer, and a water feed pump P1.

The hot water storage tank 5 is constructed in such a way as to be able to feed hot water in the tank to a heat using equipment (not shown).

In the fuel cell power generating system, the fuel cell unit 1 generates a fuel gas containing a hydrogen gas by reforming fuel such as natural gas with steam and generates power by reacting the fuel gas with an oxidizing gas, such as atmospheric oxygen by electrochemical reaction, and the heat exchanger 17 condenses the steam in the exhaust gas by cooling it down, recovers the condensed water and retains it in the water storage tank 2. Auxiliary water, such as city water, is supplied into the water storage tank 2 through the auxiliary water supply path 42.

Ions (carbonate ions, metal ions or the like) or a solid material, which are originated from auxiliary water, such as city water, are fed in the water storage tank 2 as impurities, and the supply water in the water storage tank 2 is supplied to the fuel cell unit 1 as coolant after the impurities are removed by the water purifying equipment 19 of the water treatment system 3. This can prevent the occurrence of scaling or the like in a coolant circulation path.

Because a large load is applied to the water purifying equipment 19 in the fuel cell power generating system, however, the water purifying equipment 19 in use can be complex and large, thus resulting in a large increase in equipment cost. In a case where an ion-exchange demineralizer is used, for example, the operation cost, such as a regenerating cost, increases.

Figure 7:
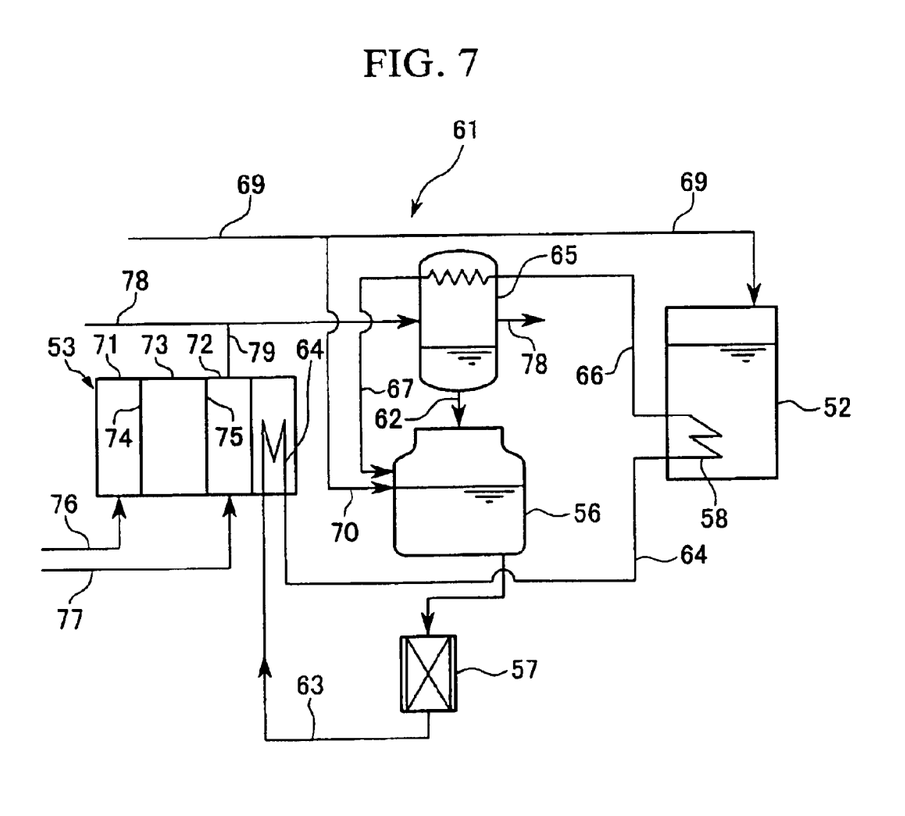
FIG. 7 is a structural diagram exemplifying another conventional fuel cell power generating system.

FIG. 7 shows another example of the fuel cell power generating system. The system comprises fuel cell power generating equipment 61 which generates power by reacting fuel gas containing a hydrogen gas with an oxidizing gas by electrochemical reaction, a hot water storage tank 52 which retains hot water heated up by using the heat generated at the time power is generated by the power generating equipment 61, and a auxiliary water supply path 69 which supplies auxiliary water, such as city water, to the hot water storage tank 52.

The fuel cell power generating equipment 61 has a fuel cell stack 53, a coolant circulation path 64 which regulates the temperature of the fuel cell stack 53, a heat exchanger 65 for recovering water which condenses and recovers steam in the exhaust gas discharged from the fuel cell stack 53, a water storage tank 56 which retains supply water recovered by the heat exchanger 65, water purifying equipment 57 which purifies the supply water in the water storage tank 56 and supplies the purified water as coolant to the coolant circulation path 64, an heat exchanger 58 which heats up and makes water hot using the coolant, and a auxiliary water supply path 70 which supplies auxiliary water, such as city water, to the water storage tank 56.

The fuel cell stack 53 is designed to have an electrolyte 73 sandwiched between a anode 71 and an cathode 72. Electrode plates 74 and 75 are respectively provided between the anode 71 and the electrolyte 73 and between the cathode 72 and the electrolyte 73.

An ion-exchange demineralizer or the like, which removes impurities from the supply water from the water storage tank 56, is used as the water purifying equipment 57.

The hot water storage tank 52 can supply hot water in the tank to heat using equipment (not shown).

The fuel cell power generating system allows a reformer (not shown) to reform fuel such as a natural gas with steam, thus generating a fuel gas containing a hydrogen gas, supplies the fuel gas to the anode 71 through a fuel-gas supply path 76, and supplies an oxidizing gas, such as air, to the cathode 72 through an oxidizing-gas supply path 77, so that the fuel gas reacts with the oxidizing gas electrochemically, thereby generating power.

The fuel-based exhaust gas from the reformer is discharged outside the system via the heat exchanger 65 through an exhaust path 78. The oxidant-based exhaust gas from the cathode 72 travels through an exhaust path 79, merges with fuel-based exhaust gas in the exhaust path 78, and is discharged outside the system via the heat exchanger 65.

As the coolant circulates in the coolant circulation path 64, the fuel cell stack 53 is cooled down to maintain the pre-set temperature. At this time, the coolant is heated to a high temperature (normally 60 to 80° C.) and is led into the heat exchanger 58.

In the heat exchanger 58, the hot coolant heats up the water in the hot water storage tank 52 and makes it as hot as about 50 to 60° C. The coolant that has passed through the heat exchanger 58 is led into the exchanger 65 through the path 66, and is then led into the water storage tank 56 through the path 67.

In the exchanger 65, the steam in the fuel-based exhaust gas and oxidant-based exhaust gas in the exhaust path 78 is cooled and condensed by the coolant, and the condensed water is recovered into the water storage tank 56 through the path 62. When the supply water in the water storage tank 56 becomes insufficient, auxiliary water such as city water is provided as a supplement through the auxiliary water supply path 70.

Carbonate ions or metal ions for example, originated from auxiliary water, such as city water, are fed in supply water in the water storage tank 56 as impurities, and the supply water is supplied to the coolant circulation path 64 in the fuel cell stack 53 as coolant through a supply path 63 after impurities are removed by the water purifying equipment 57. This can prevent the occurrence of scaling or the like in the coolant circulation path 64.

Because a large load is applied to the water purifying equipment 57 in the fuel cell power generating system, however, the water purifying equipment 57 in use can be complex and large, thus increasing the equipment cost. There is another problem that the operation cost, such as the regenerating cost for an ion exchange resin, increases.

SUMMARY OF THE INVENTION

Accordingly, it is an object of the present invention to provide a fuel cell power generating system and an operation method therefore, which can reduce the equipment cost and the operation cost.

To achieve the above object, according to the first aspect of the invention, there is provided a fuel cell power generating system comprising a fuel cell unit having a coolant circulation system; a water storage tank for supply water to be serve as coolant for the fuel cell unit; a water treatment system for purifying the supply water in the water storage tank and supplying the purified supply water as coolant to the fuel cell unit; heating means for heating water; a hot water storage tank for hot water acquired by the heating means; and a condensed-water supply system for supplying the water storage tank with condensed water obtaining by condensing steam from the hot water in the hot water storage tank.

As the fuel cell power generating system of the invention has the condensed-water supply system that supplies the water storage tank with condensed water obtaining by condensing steam from the hot water in the hot water storage tank, it is possible to supply condensed water or distilled water containing an impurity, such as ions or a solid material, which has a low concentration, to the water storage tank as auxiliary water, thereby reducing a load of demineralization or the like applied to the water treatment system.

It is therefore possible to set the capacity of the water treatment system low and restrain the equipment cost and the operation cost low.

The heating means may be constructed in such a way as to be able to heat water by using heat generated at the time the fuel cell unit generates power.

This structure can provide hot water by using the exhaust heat generated by the fuel cell unit, thus ensuring an improvement of the energy efficiency.

The condensed-water supply system may have a heat exchanger for condensing steam from the hot water in the hot water storage tank by cooling that steam with auxiliary water to be supplied to the hot water storage tank and recovering the condensed water, and a condensed-water supply path for supplying the condensed water recovered by said heat exchanger to the water storage tank.

This structure eliminates the need for a separate cooling medium at the time the condensed-water supply system condenses steam, thus restraining the operation cost further.

The hot water storage tank may be provided inside with a partition for defining a plurality of rooms in the hot water storage tank in such a way that the hot water heated by the heating means is led into one of the rooms and steam from the hot water in that room is supplied to the condensed-water supply system.

This structure can prevent water in the other rooms from entering the room whose steam is to be supplied to the condensed-water supply system, keep the temperature of the hot water in that room high, and increase the vapor pressure in that room.

It is therefore possible to increase the steam content in the gas that is led into the condensed-water supply system, thus improving the efficiency of recovering the condensed water.

This can increase the amount of the condensed water having a low impurity concentration to be supplied to the water storage tank, thus reducing a load of demineralization or the like applied to the water treatment system. This leads to a further reduction in equipment cost and operation cost.

The above-described fuel cell power generating system can be operated by using a method which supplies the water storage tank with condensed water obtaining by condensing steam from the hot water in the hot water storage tank.

According to the second aspect of the invention, there is provided a fuel cell power generating system comprising a fuel cell power generating equipment for generating power by reacting a fuel gas containing a hydrogen gas with an oxidizing gas by electrochemical reaction; a hot water storage tank for hot water heated by heat generated when power is generated by the fuel cell power generating equipment; and an auxiliary water supply path for supplying auxiliary water to the hot water storage tank. The fuel cell power generating equipment has a fuel cell stack, a coolant circulation path for regulating a temperature of the fuel cell stack, a heat exchanger for condensing steam in an exhaust gas discharged from the fuel cell stack and recovering the condensed water, a water treatment system for purifying supply water recovered by the heat exchanger and supplying the purified supply water as coolant to the coolant circulation path, and heating means for heating water to provide hot water using the coolant. The heat exchanger condenses the steam in the exhaust gas by cooling the steam with the auxiliary water flowing in the auxiliary water supply path.

To operate the fuel cell power generating system, it is possible to employ a method which allows the heat exchanger to condense the steam in the exhaust gas by cooling the steam with the auxiliary water flowing in the auxiliary water supply path.

This structure can provide condensed water using auxiliary water having a lower temperature as compared with a fuel cell power generating system having a heat exchanger which condenses steam in the exhaust gas with coolant whose temperature becomes relatively high.

It is therefore possible to improve the efficiency of cooling steam in the exhaust gas to thereby increase the recovery amount of the condensed water or distilled water whose impurities, such as ions, are present in low concentrations. This can reduce a load of demineralization or the like applied to the water purifying equipment.

This allows setting the capacity of the water purifying equipment low, thus making it possible to reduce the equipment cost and the operation cost for the water purifying equipment, and decreases the space for this equipment.

As the recovery amount of condensed water can be increased, the cost needed for auxiliary water can be restrained further.

DETAILED DESCRIPTION OF THE PREFERRED EMBODIMENTS

Figure 1:
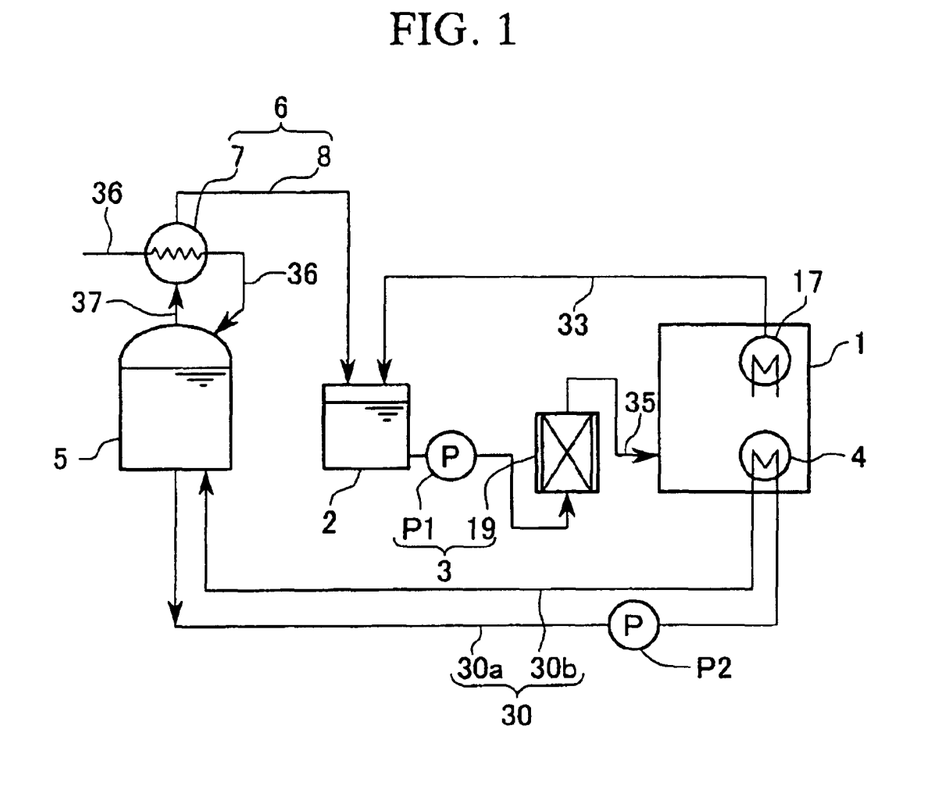
FIG. 1 is a structural diagram illustrating a first embodiment of a fuel cell power generating system according to the invention.
Figure 2:
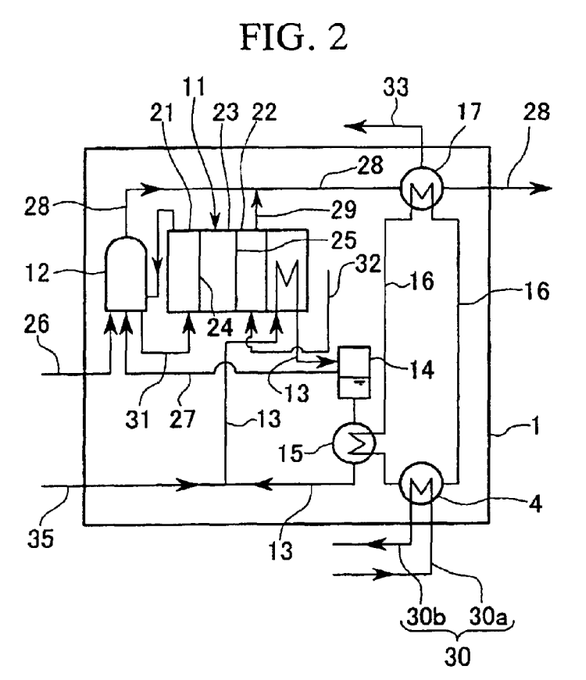
FIG. 2 is a structural diagram showing a fuel cell unit in the fuel cell power generating system shown in FIG. 1.

FIGS. 1 and 2 illustrate a first embodiment of a fuel cell power generating system according to the invention. The fuel cell power generating system comprises a fuel cell unit 1, a water storage tank 2 for supply water to serve as coolant for the fuel cell unit 1, a water treatment system 3 which performs purification of the supply water in the water storage tank 2 and supplies the resultant water as coolant to the fuel cell unit 1, a heat exchanger 4 for recovering the exhaust heat as heating means which heats up water using the exhaust heat from the fuel cell unit 1, a hot water storage tank 5 which retains hot water obtained by using the heat exchanger 4, and a condensed-water supply system 6 which supplies the water storage tank 2 with condensed water obtained by condensing steam from the hot water in the hot water storage tank 5.

As shown in FIG. 2, the fuel cell unit 1 essentially comprises a fuel cell stack 11, a reformer 12 which reforms fuel with steam, a coolant circulation path 13 where the coolant that cools the fuel cell stack 11 circulates, a steam separator 14 as a source to supply steam which is used by the reformer 12, a heat exchanger 15 which cools the coolant, a circulation path 16 where intrasystem water whose heat is exchanged with the heat of the coolant in the heat exchanger 15, and a heat exchanger 17 for recovering the condensed water in the exhaust gas which condenses steam in the exhaust gas discharged from the fuel cell unit 1 and recovers the condensed water.

The fuel cell stack 11 is so constructed as to have a anode 21 and an cathode 22 sandwiching an electrolyte 23. Electrode plates 24 and 25 are respectively provided between the anode 21 and the electrolyte 23 and between the cathode 22 and the electrolyte 23.

The steam separator 14, provided in the coolant circulation path 13, can separate steam from the coolant.

The reformer 12 can reform fuel supplied through a fuel supply path 26 with steam supplied from the steam separator 14 through a steam supply path 27, thereby producing a fuel gas containing hydrogen.

The heat exchanger 17, which is provided in the intrasystem water circulation path 16, can condense steam in the exhaust gas discharged through exhaust paths 28 and 29 from the reformer 12 and the cathode 22 by cooling the steam with the intrasystem water and recover the condensed water.

As shown in FIG. 1, the water treatment system 3 has a water purifying equipment 19 and a water feed pump P1.

A purifying equipment which eliminates an impurity such as ions or a solid material is used as the water purifying equipment 19. For example, an ion-exchange demineralizer using ion-exchanging resins, a demineralizer using a reverse osmosis membrane, and a equipment using an ultrafiltration membrane can be used as the water purifying equipment 19.

As shown in FIGS. 1 and 2, the heat exchanger 4 for recovering the exhaust heat, which is provided in the intrasystem water circulation path 16, can heat up water supplied from the hot water storage tank 5 through a supply path 30a of a hot water circulation path 30 using the intrasystem water.

The hot water storage tank 5 is designed to be able to feed hot water in the tank to heat using equipment (not shown).

As shown in FIG. 1, auxiliary water supply path 36 which supplies auxiliary water is connected to the hot water storage tank 5. When the amount of water in the hot water storage tank 5 becomes insufficient due to the supply of hot water to the heat using equipment (not illustrated), auxiliary water can be supplied into the hot water storage tank 5.

The condensed-water supply system 6 has a heat exchanger 7 for recovering the condensed water which condenses and recovers steam from the hot water in the hot water storage tank 5, and a condensed-water supply path 8 which supplies the condensed water recovered by the heat exchanger 7 to the water storage tank 2.

The heat exchanger 7 is provided in the auxiliary water supply path 36 which supplies auxiliary water into the hot water storage tank 5. The heat exchanger 7 can condense steam in the gas in the hot water storage tank 5, which is led out through an outlet path 37 connected at the upper portion of the tank 5, with auxiliary water which flows in the auxiliary water supply path 36, and recover the resultant water as condensed water.

The following will discuss how to use the fuel cell power generating system.

As shown in FIG. 2, the fuel cell power generating system feeds fuel, such as a desulfurated natural gas or naphtha to the reformer 12 through the fuel supply path 26, and reforms the fuel with steam supplied from the steam separator 14 through the steam supply path 27, thereby generating a hydrogen-contained fuel gas.

The fuel gas is supplied to the anode 21 of the fuel cell stack 11 via a carbon monoxide conversion unit or the like (not shown) through a fuel-gas supply path 31 and an oxidizing gas such as air is supplied to the cathode 22 through an oxidizing-gas supply path 32. The fuel gas reacts with the oxidizing gas electrochemically, thus generating power.

The fuel-based exhaust gas from the reformer 12 is discharged outside the system via the heat exchanger 17 through the exhaust path 28. The oxidant-based exhaust gas from the cathode 22 merges with the fuel-based exhaust gas in the exhaust path 28 through the exhaust path 29 and is discharged outside the system via the heat exchanger 17.

As the coolant circulates in the coolant circulation path 13, the fuel cell stack 11 is cooled to maintain a predetermined temperature. At this time, the coolant is heated to a high temperature and is led into the steam separator 14.

The steam separator 14 separates steam from the coolant and feeds part of the steam to the reformer 12 through the steam supply path 27.

The coolant that has passed through the steam separator 14 is cooled down in the heat exchanger 15 through heat exchange with the intrasystem water that flows in the intrasystem water circulation path 16, and is then supplied to the fuel cell stack 11 again. Thereafter, the circulation process is repeated.

The intrasystem water flowing in the intrasystem water circulation path 16 cools the coolant in the heat exchanger 15 and cools the fuel-based exhaust gas and oxidant-based exhaust gas in the exhaust path 28, thus condensing the steam in the exhaust gas.

The condensed water that has been recovered by the heat exchanger 17 is fed to the water storage tank 2 through a condensed-water recovery path 33.

In the heat exchanger 4, the intrasystem water heated by the heat exchangers 15 and 17 heats up the water that is supplied from the hot water storage tank 5 with a water feed pump P2 through the supply path 30*a*. The heated hot water is supplied through a return path 30*b* to the hot water storage tank 5.

In short, the heat exchanger 4 heats up water with the intrasystem water, heated by the coolant that has become hot with the heat (exhaust heat) generated when the fuel cell stack 11 generates power.

When the amount of water in the hot water storage tank 5 becomes insufficient due to the supply of hot water to the unillustrated heat using equipment, auxiliary water, such as city water, is supplied to the hot water storage tank 5 through the auxiliary water supply path 36.

Part of the coolant flowing in the coolant circulation path 13 is separated as steam by the steam separator 14 and is led out from the coolant circulation path 13 through the steam supply path 27. It is therefore necessary to supplement insufficient coolant.

Accordingly, the supply water in the water storage tank 2 is supplied to the water purifying equipment 19 using the water feed pump P1, impurities are removed from the supply water there, and the resultant purified water is supplied as coolant to the coolant circulation path 13 through a coolant supply path 35.

According to the fuel cell power generating system of the embodiment, when the supplement of the coolant reduces the amount of water in the water storage tank 2, supplementary water is provided into the water storage tank 2 as follows by using the condensed-water supply system 6.

As the water in the hot water storage tank 5 is hot, the vapor pressure in the hot water storage tank 5 is high and the gas in the hot water storage tank 5 that is led out through the outlet path 37 contains a lot of steam.

As the steam-containing gas is led to the heat exchanger 7 through the outlet path 37, the steam in the gas is cooled and condensed by the auxiliary water (city water or the like) that flows in the auxiliary water supply path 36.

The condensed water is supplied as auxiliary water to the water storage tank 2 through the condensed-water supply path 8. As the condensed water is distilled water whose impurities such as ions have a very low concentration, the amount of the impurities fed into the water storage tank 2 are minimized and the concentration of the impurities in the water storage tank 2 become lower. This reduces a load of demineralization or the like applied to the water purifying equipment 19.

It is therefore possible to set the capacity of the water purifying equipment 19 low. This can contribute to reducing the equipment cost needed for the water treatment system 3 and suppressing the operation cost, such as the cost of recycling the ion exchange resin, low.

Reducing the required capacity of the water purifying equipment 19 allows designing smaller the equipment 19, thus decreasing the space for this equipment.

As the heat exchanger 4 is designed in such a way as to heat up water using, as exhaust heat, the heat generated when the fuel cell unit 1 generates power, hot water can be provided by effectively using the exhaust heat. This can improve the energy efficiency.

The heat exchanger 7 is so constructed as to be able to condense steam in the gas in the hot water storage tank 5 by cooling the steam with the auxiliary water flowing in the auxiliary water supply path 36. This structure eliminates the need for a separate cooling medium while condensing steam in the condensed-water supply system 6, thus leading to a further reduction in operation cost.

Figure 3:
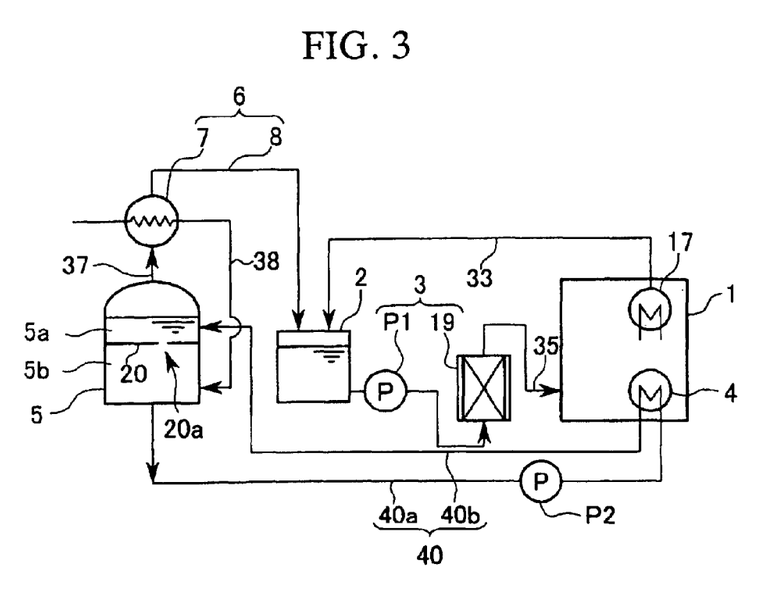
FIG. 3 is a structural diagram illustrating a second embodiment of the fuel cell power generating system according to the invention.

FIG. 3 illustrates a second embodiment of the fuel cell power generating system according to the invention, which has a partition 20 provided in the hot water storage tank 5 to separate the interior of the tank 5 into two rooms or upper and lower rooms 5*a* and 5*b*.

The partition 20 serves to keep the temperature of the hot water in the upper room 5*a* high to increase the amount of steam to be led into the heat exchanger 7. The partition 20 has a ventilation port 20*a* which permits ventilation of hot water between the upper room 5*a* and the lower room 5*b*.

The inside diameter of the ventilation port 20*a* is so set as to restrict the flow of water in the lower room 5*b* into the upper room 5*a*.

The partition 20 can be formed of a metal, such as stainless steel, or a synthetic resin, such as polyvinyl chloride. Particularly, it is preferable to use a synthetic resin which has an excellent heat insulating property.

A supply path 40*a* and return path 40*b* of a hot water circulation path 40 are respectively connected to the lower portion and upper portion of the hot water storage tank 5, so that after the water heated by the heat exchanger 4 is led into the upper room 5*a* through the return path 40*b*, the water flows to the lower room 5*b* via the ventilation port 20*a* and flows into the supply path 40*a* from the lower room 5*b*.

A auxiliary water supply path 38 which feeds auxiliary water into the lower room 5*b* is connected to the lower portion of the hot water storage tank 5, so that when the amount of water in the hot water storage tank 5 becomes insufficient due to the supply of hot water to a heat using equipment (not shown), auxiliary water can be supplied into the lower room 5*b*.

In the fuel cell power generating system, high-temperature hot water that has been heated by the heat exchanger 4 and is returned to the hot water storage tank 5 through the return path 40*b* is led into the upper room 5*a* located above the partition 20.

The steam that is originated from the vaporization of the high-temperature hot water led into the upper room 5*a* is supplied to the heat exchanger 7 through the outlet path 37.

The hot water in the upper room 5*a* flows into the lower room 5*b* from the ventilation port 20*a* according to the circulation flow in the hot water circulation path 40, and flows to the heat exchanger 4 through the supply path 40*a*.

The hot water in the storage tank 5 is cooled by the outside air so that its temperature gradually falls. Because the upper room 5*a* corresponds to the upstream side of the flow of the hot water in the hot water storage tank 5 and the partition 20 prevents the flow of the hot water into the upper room 5*a* from the lower room 5*b*, however, the temperature of the hot water in the upper room 5*a* is kept relatively high.

The fuel cell power generating system of the second embodiment, like the fuel cell power generating system of the first embodiment, can reduce the concentration of impurities in the supply water to be supplied to the water purified equipment 19, thus reducing the load applied to the water purified equipment 19, and allowing the equipment to be made smaller, thus lowering the equipment cost and the operation cost.

According to the embodiment, the provision of the partition 20 that defines the upper and lower rooms 5a and 5b in the hot water storage tank 5 can prevent hot water of a relatively low temperature in the lower room 5b from being mixed with hot water of a high temperature in the upper room 5a. It is therefore possible to keep the temperature of the hot water in the upper room 5a high and increase the vapor pressure in the upper room 5a.

This can increase the steam content in the gas that is led into the heat exchanger 7, thus improving the efficiency of recovering the condensed water in the heat exchanger 7.

It is therefore possible to increase the supply amount of the condensed water or distilled water having a low impurity concentration to the water storage tank 2, thus lowering the impurity concentration in the water storage tank 2 and reducing the load of demineralization or the like applied to the water purifying equipment 19.

This can allow the capacity of the water purifying equipment 19 to be set low, thus leading to lower equipment and operation costs.

Although the heat exchanger 4 which uses the exhaust heat from the fuel cell unit 1 is provided as a heating means in the fuel cell power generating system of the embodiment, the heating means that heats up water to be supplied to a heat using equipment is not limited to the type which uses the exhaust heat from the fuel cell unit 1.

Figure 4:
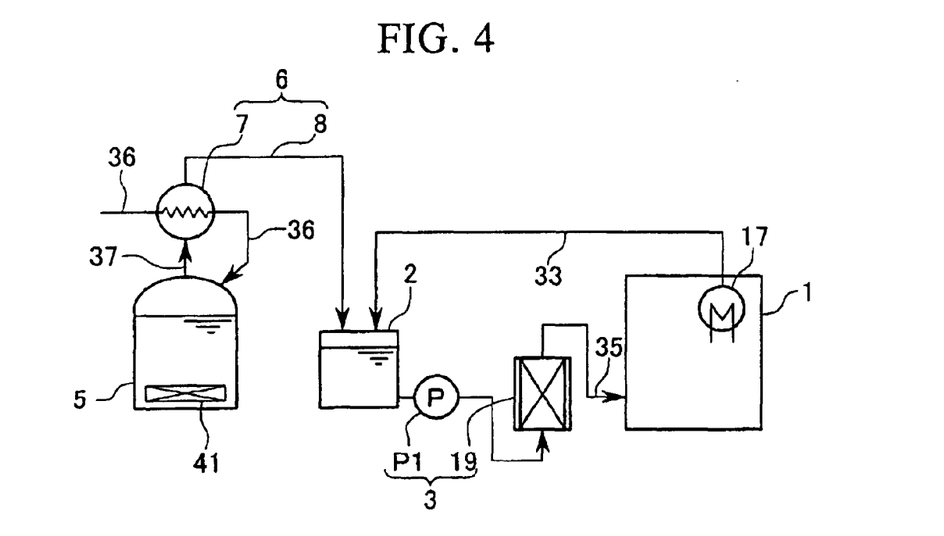
FIG. 4 is a structural diagram illustrating a third embodiment of the fuel cell power generating system according to the invention.

As shown in FIG. 4, for example, a heater 41 which heats up water in the storage tank 5 may be provided in the tank 5 in place of the heat exchanger 4.

Although the illustrated fuel cell power generating system of the embodiment has the structure that uses supply water recovered by the heat exchanger 17 as coolant, the fuel cell power generating system of the invention is not limited to this type but may have a structure that does not recover steam in the exhaust gas and uses condensed water from condensed-water supply system 6 or auxiliary water, such as city water, as supply water.

Because the fuel cell power generating system of the invention can maintain the impurity concentration in the supply water to be supplied to the water treatment system at a low level, the water treatment system may be eliminated.

Further, the coolant circulation path may be designed in such a way that the coolant is led into the water storage tank 2 through the condensed-water recovery path 33 after passing the fuel cell stack 11 and the steam separator 14.

Figure 5:
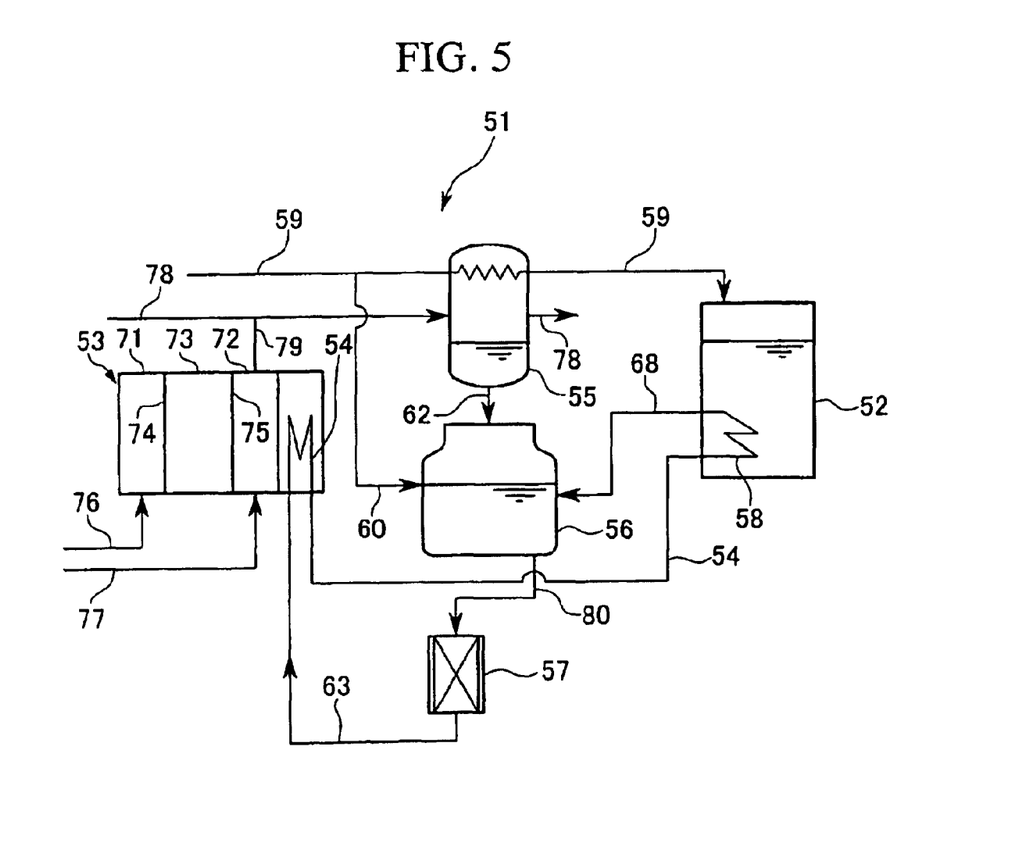
FIG. 5 is a structural diagram illustrating a fourth embodiment of the fuel cell power generating system according to the invention.

FIG. 5 illustrates a fourth embodiment of the fuel cell power generating system according to the invention. The fuel cell power generating system comprises a fuel cell power generating equipment 51 which generates power by reacting the fuel gas with an oxidizing gas electrochemically, a hot water storage tank 52 which retains hot water heated by using the heat produced while generating power, and a auxiliary water supply path 59 which supplies auxiliary water, such as city water, to the hot water storage tank 52.

The fuel cell power generating equipment 51 has a fuel cell stack 53, a coolant circulation path 54 which regulates the temperature of the fuel cell stack 53, a heat exchanger 55 for recovering water which condenses and recovers steam in the exhaust gas discharged from the fuel cell stack 53, a water storage tank 56 which retains supply water recovered by the heat exchanger 55, a water purifying equipment 57 which purifies the supply water in the water storage tank 56 and supplies the purified water as coolant to the coolant circulation path 54, an heat exchanger 58 as heating means which heats water using the coolant to provide hot water, and a auxiliary water supply path 60 which feeds auxiliary water, such as city water, to the water storage tank 56.

The fuel cell stack 53 is so constructed as to have a anode 71 and an cathode 72 sandwiching an electrolyte 73. Electrode plates 74 and 75 are respectively provided between the anode 71 and the electrolyte 73 and between the cathode 72 and the electrolyte 73.

An ion-exchange demineralizer or the like, which removes an impurity from the supply water from the water storage tank 56, is used as the water purifying equipment 57.

The hot water storage tank 52 can supply hot water in the tank to heat using equipment (not shown).

In the fuel cell power generating system of the embodiment, the heat exchanger 55 is provided in the auxiliary water supply path 59 and can condense steam in the exhaust gas discharged from the anode 71 and the cathode 72 through exhaust paths 78 and 79 by cooling the steam with auxiliary water and recover the condensed water.

The following will discuss how to use the fuel cell power generating system.

In the fuel cell power generating system, a reformer (not shown) reforms fuel such as a natural gas to steam, thus generating a fuel gas containing a hydrogen gas, the fuel gas is supplied to the anode 71 through a fuel-gas supply path 76, an oxidizing gas such as air is supplied to the cathode 72 through an oxidizing-gas supply path 77, and the fuel gas reacts with oxidizing gas electrochemically, thereby generating power.

The fuel-based exhaust gas from the reformer is discharged outside the system via the heat exchanger 55 through the exhaust path 78. The oxidant-based exhaust gas from the cathode 72 merges with the fuel-based exhaust gas in the exhaust path 78 through the exhaust path 79 and is discharged outside the system via the heat exchanger 55.

As the coolant circulates in the coolant circulation path 54, the fuel cell stack 53 is cooled down to maintain a predetermined temperature. At this time, the coolant is heated to a high temperature (normally 60 to 80° C.) and is led into the heat exchanger 58.

In the heat exchanger 58, the water in the hot water storage tank 52 is heated to become hot water of about 50 to 60° C. by the high-temperature coolant whose temperature in turn falls to about 50 to 60° C.

The coolant that has passed the heat exchanger 58 is fed through a path 68 to the water storage tank 56.

When the amount of water in the water storage tank 56 becomes insufficient, auxiliary water, such as city water, is supplied to the water storage tank 56 through the auxiliary water supply path 60.

When the amount of water in the hot water storage tank 52 becomes insufficient due to the supply of hot water to the heat using equipment (not shown), auxiliary water, such as city water, is supplied to the hot water storage tank 52 through the auxiliary water supply path 59. The temperature of the city water is normally 5 to 25° C.

In the heat exchanger 55, steam in the fuel-based exhaust gas and oxidant-based exhaust gas in the exhaust path 78 is cooled down with the auxiliary water flowing in the auxiliary water supply path 59 to be condensed and the condensed water is recovered into the water storage tank 56 through a path 62.

As an impurity, such as carbonate ions or metal ions, originated from auxiliary water, such as city water, is mixed in supply water in the water storage tank 56, the supply water is supplied through a path 80 to the water purifying equipment 57 to remove its impurities and is then connected to the coolant circulation path 54 in the fuel cell stack 53 as coolant through a supply path 63.

The fuel cell power generating system of the embodiment has the heat exchanger 55 provided in the auxiliary water supply path 59 so that steam in the exhaust gas discharged through the exhaust paths 78 and 79 can be cooled and condensed with auxiliary water that flows in the auxiliary water supply path 59. Therefore, this system can condense steam using low-temperature auxiliary water, as compared with a fuel cell power generating system (see FIG. 7) which can condense steam in the exhaust gas with coolant whose temperature becomes relatively high.

It is therefore possible to improve the efficiency of cooling steam in the exhaust gas to thereby increase the recovery amount of condensed water, which is distilled water whose impurities such as ions have a low concentration.

This structure can lower the impurity concentration in the water storage tank 56, thus reducing the load of demineralization or the like applied to the water purifying equipment 57.

It is therefore possible to set the demanded capacity of the water purifying equipment 57 low, thus reducing the equipment cost needed for the water purifying equipment 57 and restrain operation costs, such as the regenerating cost for an ion exchange resin.

As the capacity of the water purifying equipment 57 can be set low, the equipment can be made smaller, thus reducing the required space for the equipment.

Because the recovery amount of condensed water can be increased, it is possible to reduce the amount of auxiliary water to be supplied to the water storage tank 56 through the auxiliary water supply path 60. This can lead to a reduction in the cost that is needed for the auxiliary water.

What is claimed is:

1. A fuel cell power generating system comprising:
    a fuel cell unit having a coolant circulation system;
    a water storage tank for supply water to serve as coolant for said fuel cell unit;
    a water treatment system for purifying said supply water in said water storage tank and supplying said purified supply water as coolant to said fuel cell unit;
    a heating device for heating water;
    a hot water storage tank for hot water acquired by said heating device; and
    a condensed-water supply system for supplying said water storage tank with condensed water obtained by condensing steam from said hot water in said hot water storage tank,
    wherein said condensed-water supply system has a heat exchanger for condensing steam from said hot water in said hot water storage tank by cooling that steam with auxiliary water to be supplied to said hot water storage tank and recovering said condensed water, and a condensed-water supply path for supplying said condensed water recovered by said heat exchanger to said water storage tank.

2. The fuel cell power generating system according to claim 1, wherein said heating device is constructed to heat water by using heat generated when said fuel cell unit generates power.

3. The fuel cell power generating system according to any one of claims 1 and 2, wherein said hot water storage tank is provided inside with a partition for defining a plurality of rooms in said hot water storage tank in such a way that said hot water heated by said heating device is led into one of said rooms and steam from said hot water in that room is supplied to said condensed-water supply system.

4. A method of operating a fuel cell power generating system comprising a fuel cell unit having a coolant circulation system, a water storage tank for supply water to serve as coolant for said fuel cell unit, a water treatment system for purifying said supply water in said water storage tank and supplying said purified supply water as coolant to said fuel cell unit, a heating device for heating water, and a hot water storage tank for hot water acquired by said heating device, said method comprising the steps of:
    condensing steam from said hot water in said hot water storage tank; and
    supplying said water storage tank with condensed water obtained by condensing steam from said hot water in said hot water storage tank.

5. A fuel cell power generating system comprising:
    a fuel cell power generating equipment for generating power by reacting a fuel gas containing a hydrogen gas with an oxidizing gas electrochemically;
    a hot water storage tank for hot water heated by heat generated while power is generated by said fuel cell power generating equipment; and
    an auxiliary water supply path for supplying auxiliary water to said hot water storage tank,
    said fuel cell power generating equipment having a fuel cell stack, a coolant circulation path for regulating a temperature of said fuel cell stack, a heat exchanger for condensing steam in an exhaust gas discharged from said fuel cell stack and recovering said condensed water, water purifying equipment for purifying water recovered by said heat exchanger and supplying said purified water as coolant to said coolant circulation path, and a heating device for heating water to provide hot water using said coolant,
    wherein said heat exchanger is provided in said auxiliary water supply path, and condenses said steam in said exhaust gas by cooling said steam with said auxiliary water flowing in said auxiliary water supply path.

6. A method of operating a fuel cell power generating system comprising a fuel cell power generating equipment for generating power by reacting a fuel gas containing a hydrogen gas with an oxidizing gas electrochemically, a hot water storage tank for hot water heated by heat generated while power is generated by said fuel cell power generating equipment, and an auxiliary water supply path for supplying auxiliary water to said hot water storage tank, wherein
    said fuel cell power generating equipment has a fuel cell stack, a coolant circulation path for regulating a temperature of said fuel cell stack, a heat exchanger for condensing steam in an exhaust gas discharged from said fuel cell stack and recovering said condensed water, water purifying equipment for purifying supply water recovered by said heat exchanger and supplying said purified water as coolant to said coolant circulation path, and a heating device for heating water to provide hot water using said coolant, and
    said heat exchanger is provided in said auxiliary water supply path, and condenses said steam in said exhaust gas by cooling said steam with said auxiliary water flowing in said auxiliary water supply path.

7. A fuel cell power generating system according to claim 1, wherein the condensed water is distilled water whose impurities have a concentration that reduces the demineralization load applied to the water purifying equipment.

8. A fuel cell power generating system according to claim 5, wherein the condensed water is distilled water whose impurities have a concentration that reduces the demineralization load applied to the water purifying equipment.

9. A fuel cell power generating system according to claim 1, wherein the heating device is a heater.

10. A fuel cell power generating system according to claim 5, wherein the heating device is a heater.

11. A fuel cell power generating system according to claim 3, wherein the partition is formed of a synthetic resin.

* * * * *